Figure 1:
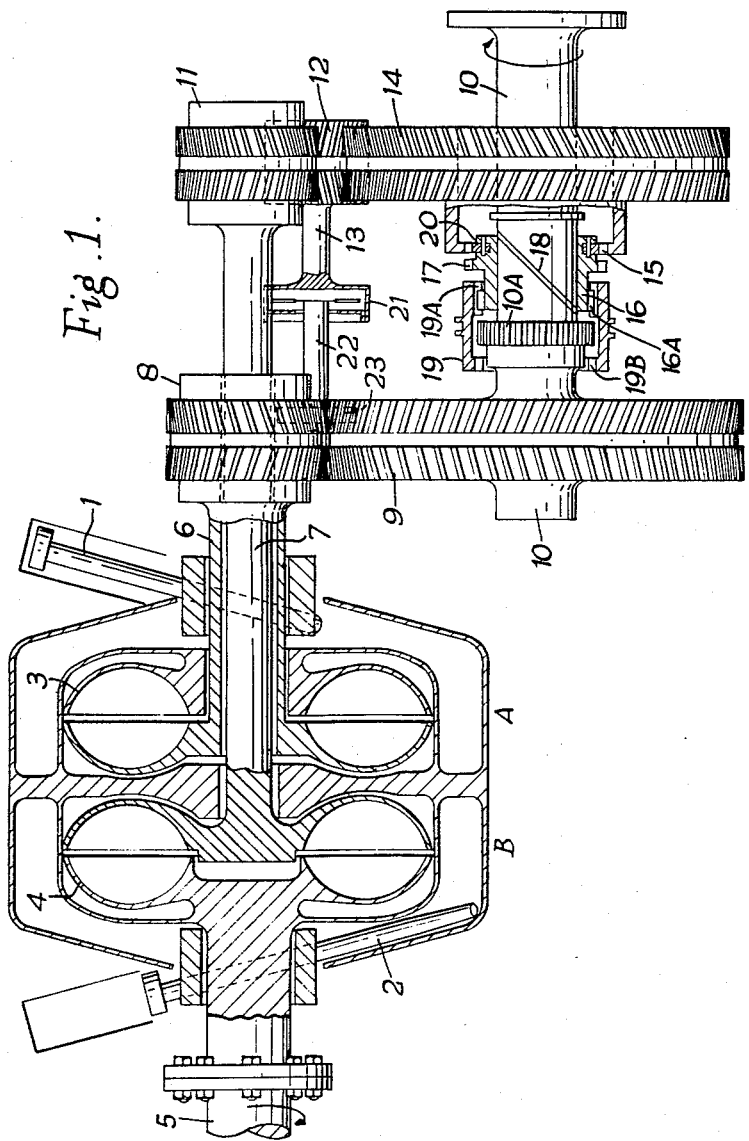

June 7, 1960    H. SINCLAIR    2,939,328
POWER TRANSMISSION SYSTEMS
Filed March 13, 1956    4 Sheets-Sheet 1

INVENTOR
Harold Sinclair
BY
Benjamin Swedler
ATTORNEY

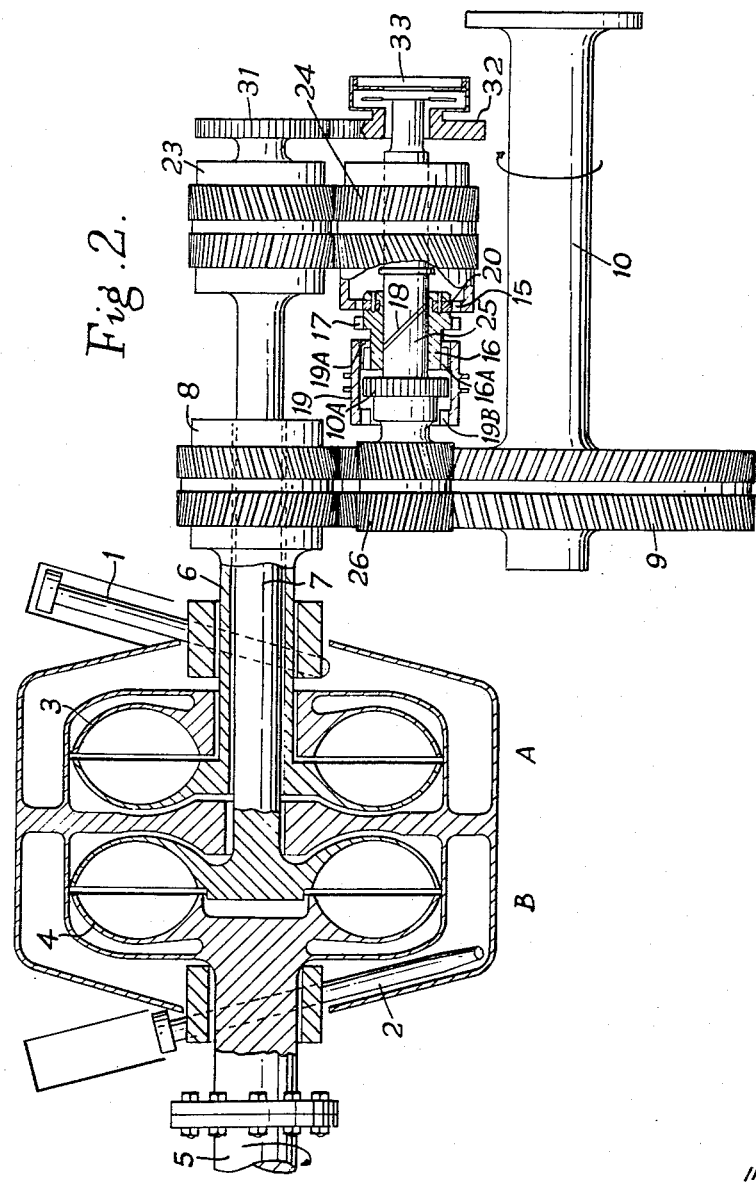

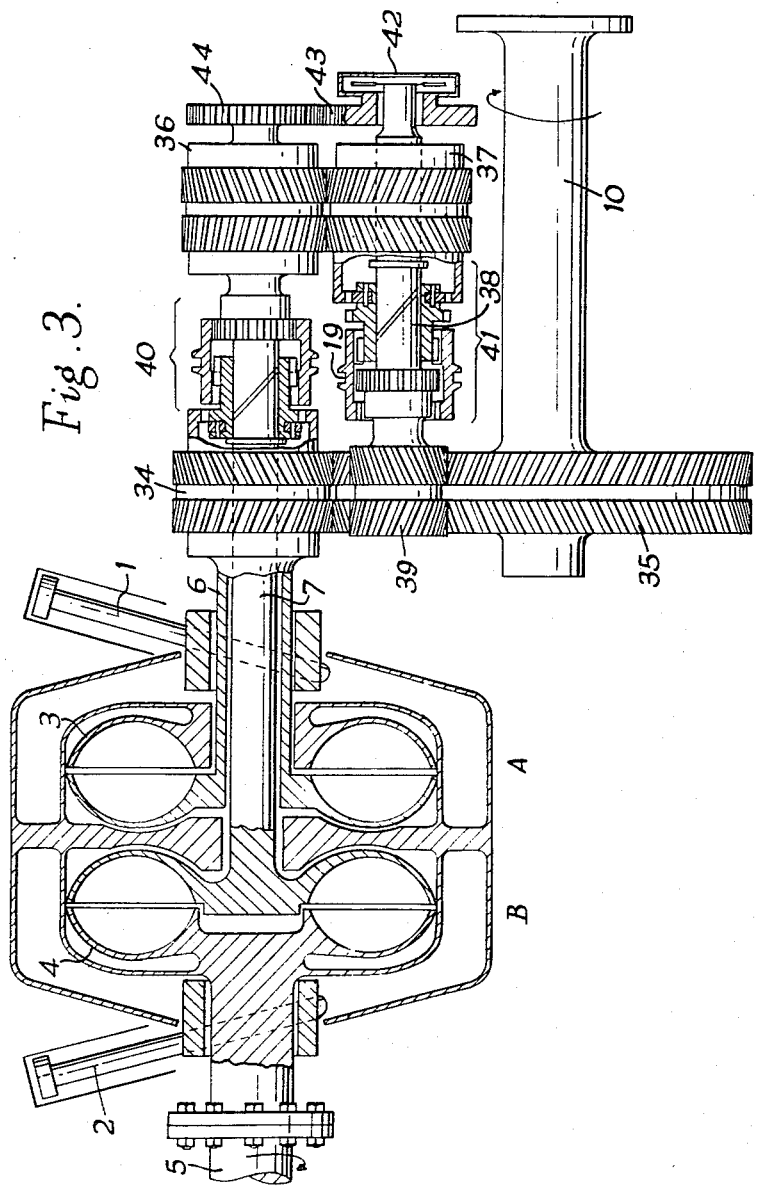

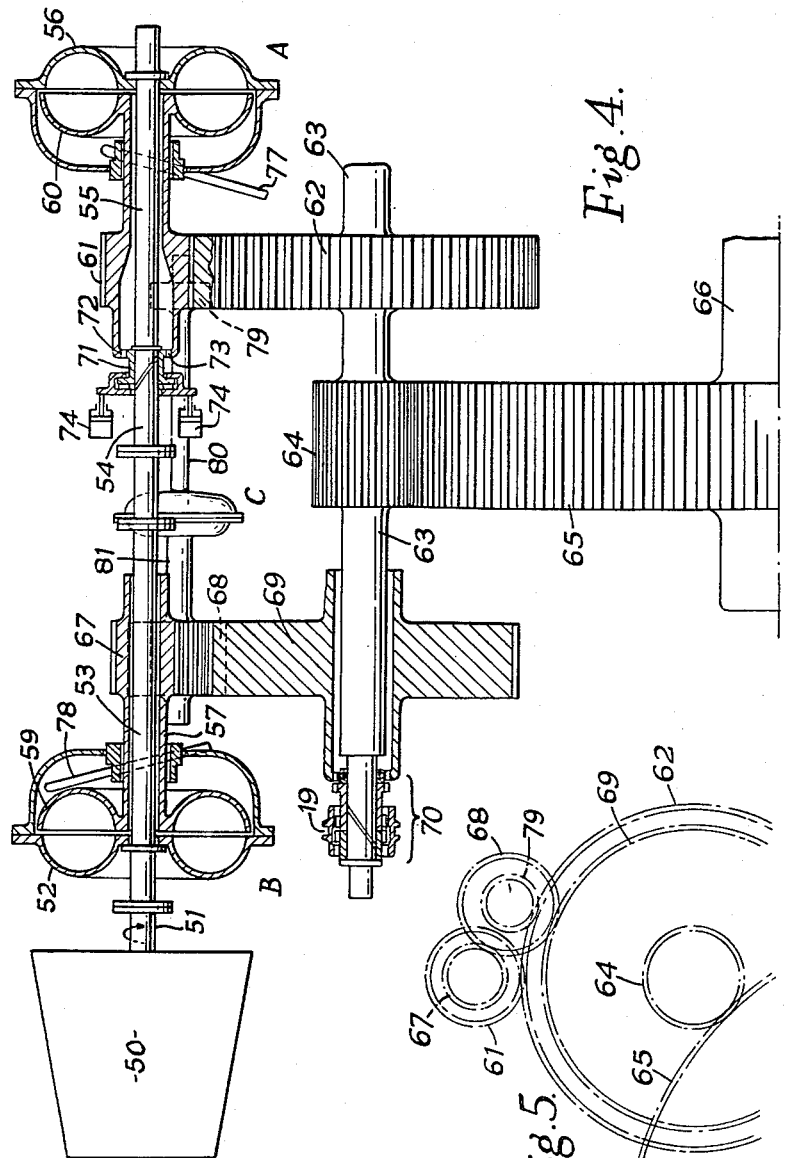

р

United States Patent Office 2,939,328
Patented June 7, 1960

2,939,328

POWER TRANSMISSION SYSTEMS

Harold Sinclair, Magnolia House, 4 Clarence Crescent, Windsor, Berkshire, England Filed Mar. 13, 1956, Ser. No. 571,161

Claims priority, application Great Britain Mar. 14, 1955

6 Claims. (Cl. 74—339)

This invention relates to power transmission systems of the type wherein the driven member is arranged to be driven selectively via forward drive gearing or via reverse drive gearing, particularly for ahead and astern working in marine propulsion.

In conventional systems of this type, the gears of the reverse gear train are permanently drivably coupled to the driven member, and while the forward drive gearing is in operation all the gear wheels of the reverse drive gearing are rotated idly backwards by the forward rotating driven member, with consequent power losses due to oil churning in the gear teeth and in the bearings of the gear wheels of the reverse gear train. The object of the invention is to provide a system of the type first referred to herein, in which the above-mentioned disadvantage is overcome.

According to the invention clutch means are provided whereby at least a part of the reverse gear train may be disconnected from the driven member during times when the forward drive gearing is operative for the normal ahead working of the system.

Advantageously the said clutch means are of a type adapted to engage automatically upon passage of the clutch elements through the condition of synchronism, and an auxiliary synchronising drive may be provided for the clutch elements for the purpose of initiating clutch engagement, or bringing the clutch elements into a condition for engagement.

In order that the invention may be clearly understood and readily carried into effect it will now be described in more detail with reference to the accompanying drawings, Figs. 1, 2, 3 and 4 of which are diagrammatic views respectively of four different forms of power transmission system according to the invention as applied to the drive of a ship's propeller. Fig. 5 is a diagrammatic view showing the relative positions of parts of the gearing of the system shown in Fig. 4. In the various figures, corresponding parts have the same reference numerals.

Referring to Fig. 1, the transmission system shown comprises two hydraulic turbo couplings A and B provided with means (not shown) for filling with working fluid and having adjustable scoop tubes 1 and 2 respectively for varying the degree of filling of the working circuits of the couplings. The turbo couplings are arranged coaxially with their impellers 3 and 4 both drivably coupled to the output shaft 5 of a non-reversing diesel engine (not shown). The output shaft 6 of the turbo coupling A, hereinafter termed the ahead coupling, is a sleeve shaft that surrounds the output shaft 7 of the other turbo coupling B, hereinafter termed the astern coupling.

The sleeve output shaft of the ahead coupling A has fixed on it an ahead pinion 8 meshing with a gear wheel 9 fixed on the gear wheel shaft 10, which is assumed to be coupled to a propeller shaft (not shown). The shaft 7 of the astern coupling B projects through the ahead pinion 8, and has fixed on its an astern pinion 11 meshing with an idler gear 12 on a lay shaft 13, the idler gear 12 also meshing with a gear wheel 14 mounted on the shaft 10. The gear wheel 14 is provided with a clutch by means of which it can be drivably connected to or disconnected from the shaft 10. In the particular case shown by way of example the clutch is an inverted arrangement of the synchronous self-shifting (S.S.S.) type of clutch, and comprises a ring of internal clutch teeth 15 carried by the gear wheel 14, an intermediate member 16 provided with a ring of external clutch teeth 17, and movable helically on the shaft 10 by virtue of internal helical splines in the intermediate member engaged with external helical splines 18 on the shaft 10, and an axially slidable control sleeve 19. The control sleeve 19 has internal straight splines 19A that are permanently engaged with straight external splines 16A on the intermediate member 16, and the control sleeve 19 also has internal splines 19B that can be engaged with external dogs 10A on the shaft 10 when the teeth 15 and 17 are fully engaged with one another, to lock the intermediate member 16 in the engaged condition. The intermediate member 16 carries pawls 20 which co-operate with the teeth 15 to engage the clutch when there is relative angular movement in one sense between the gear wheel 14 and the shaft 10. Upon relative movement in the other sense the clutch disengages automatically, the member 16 moving helically on shaft 10 to a position in which the pawls 20 and the internal teeth 15 are in ratcheting relationship, as shown. The intermediate member 16 can move further axially to a pawl-free position, to the left of that shown, in which the pawls 20 are out of the path of the teeth 15. By moving the control sleeve 19 to the right the intermediate member 16 is moved into the pawl-engaged or ratcheting position.

The term "inverted arrangement" is used herein in connection with the synchronising clutch to describe the characteristic that if the control sleeve 19 is in the unlocked position, i.e., with the splines 19B disengaged from the dogs 10A, the application of driving torque in the normal ahead sense of rotation will cause the intermediate member 16 to move out of toothed engagement with the internal clutch teeth 15; and conversely, if the intermediate member has been moved from the pawl-free condition to the ratcheting condition (by shifting of the control sleeve 19 to the right until the splines 19B abut against the shaft dogs 10A), the application of over-running torque in the normal ahead sense of rotation will cause the intermediate member 16 to move synchronously into toothed engagement with the internal clutch teeth 15.

When the ship is going ahead, only the ahead coupling A has its working circuit filled, and the output sleeve shaft 6 of the ahead coupling A drives the ahead gear wheel 9 and the shaft 10 in the ahead direction indicated by the arrow. If the astern gear wheel 14 were fixed on the shaft 10, the astern gear wheel 14, idler gear 12, astern pinion 11, and the output shaft 7 and the runner of the astern turbo coupling B would all rotate continuously during ahead drive with the runner of the astern turbo coupling B rotating in the opposite direction to its impeller 4. The S.S.S. clutch, however, is in a disengaged position, which may be either the ratcheting position as shown or preferably the pawl-free position referred to above, and the astern gear wheel 14 is, therefore, disconnected from the shaft 10 during ahead drive so that the astern gear train 11, 12, 14 and the runner of the astern coupling 13 are not rotated, except possibly at a low speed due to windage in the empty astern turbo coupling B.

In order, when astern drive is required, to effect engagement of the S.S.S. clutch when the shaft system is in rotation during ahead drive, an auxiliary synchronising drive is provided, comprising an auxiliary clutch 21, shown as a friction clutch, between shaft 13 of the idler gear 12 and the shaft 22 of an auxiliary pinion 23 in mesh with the ahead gear wheel 9, and the gear ratio through the said auxiliary drive is such that when the auxiliary clutch 21 is engaged, the astern gear wheel 14 is driven in the ahead direction (i.e. in the same sense as the shaft 10) slightly faster than the shaft 10. Therefore, if the intermediate member 16 has been adjusted to the ratcheting condition, the engagement of the auxiliary clutch 21 causes the nose of a pawl 20 to be engaged by a tooth 15 so that the intermediate member 16 is shifted into toothed engagement with the gear wheel 14, so that the S.S.S. clutch assumes the engaged condition, in which it is then locked by means of the control sleeve 19. The auxiliary friction clutch 21 may then be disengaged. The ahead coupling A is then emptied and the astern coupling B is filled, these two operations being advantageously effected simultaneously.

In the embodiment of the invention shown in Fig. 2, also for drive by a non-reversing diesel engine, the output sleeve shaft 6 of the ahead turbo coupling A has fixed on it an ahead pinion 8 meshing with a large ahead gear wheel 9 fixed on the shaft 10 coupled to the propeller shaft (not shown). The output shaft 7 of the astern coupling B has fixed on it a gear wheel 23 meshing with a gear wheel 24 concentric with a countershaft 25 on which is fixed an astern pinion 26 in mesh with the large gear wheel 9 on the shaft 10. In this case an inverted S.S.S. clutch with control sleeve is provided for drivably connecting the gear wheel 24 to and disconnecting it from the countershaft 25. An auxiliary synchronising drive is provided, comprising an auxiliary pinion 31 fixed on the output shaft 6 of the astern coupling, and meshing with an auxiliary pinion 32 that is normally loose on the countershaft 25, and a friction clutch 33 is provided for clutching the auxiliary pinion 32 to the countershaft 25 temporarily for the purpose of engaging the S.S.S. clutch when the astern turbo coupling B is empty and a changeover from ahead to astern drive is to be made. When the friction clutch 33 is engaged, the gear wheel 24 is driven in the same sense as shaft 25 but at a slightly higher speed, thereby causing engagement of the S.S.S. clutch, which will have been adjusted to the ratcheting position. When the S.S.S. clutch has been engaged and then locked in the engaged position by means of the control sleeve 19, the friction clutch 33 may be disengaged, the ahead turbo coupling A is emptied and the astern coupling B is filled.

During ahead running, with the astern coupling B empty, the astern pinion 26 is rotated by the gear wheel 9, but the gear wheels 23 and 24 and the auxiliary pinions 31 and 32, also the runner of the astern coupling B do not rotate, except possibly at a low speed due to windage drag, since the gear wheel 24 is disconnected from the countershaft 25 due to the inverted S.S.S. clutch being disengaged.

In both of the above-described embodiments of the invention one of the turbo couplings is employed exclusively for ahead drive and the other is employed exclusively for astern drive.

In the system now to be described with reference to Fig. 3, which again is for drive by a non-reversible diesel engine, both turbo couplings A and B may be employed for ahead drive, during normal steady speed operation, but when manoeuvring coupling A is employed alone for ahead drive and the coupling B alone for astern drive. Coupling B will, for convenience, continue to be referred to as the astern coupling, and coupling A will still be termed the ahead coupling.

The output sleeve shaft 6 of the ahead coupling A has fixed on it a pinion 34 that is in mesh with a large gear wheel 35 fixed to the gear wheel shaft 10. The output shaft 7 of the astern coupling B has fixed on it a gear wheel 37 mounted in bearings concentrically with a countershaft 38 that carries an astern pinion 39 in mesh with the large gear wheel 35. An S.S.S. clutch 40 is provided between the ahead pinion 34 and the output shaft 7 of the astern turbo coupling B, and a second S.S.S. clutch 41 is provided between the countershaft 38 and the second gear wheel 37. The S.S.S. clutch 41 is of the inverted type as described above, whereas the S.S.S. clutch 40 is of normal or non-inverted type. An auxiliary gear wheel 43 mounted on the countershaft 38 is normally free thereon, but can be clutched to the shaft 38 by means of a friction clutch 42. On the output shaft 7 of turbo coupling B is fixed an auxiliary gear wheel 44 that is in mesh with the gear wheel 43.

During normal ahead running with both turbo couplings A and B filled, the S.S.S. clutch 40 is engaged, so that both turbo couplings are drivably coupled to the ahead pinion 34, and the S.S.S. clutch 41 is disengaged, the gear wheels 36 and 37 and the astern pinion 39 being rotated, also the auxiliary gear wheels 43 and 44. During astern running with the ahead turbo coupling A empty and the astern turbo coupling B full, the S.S.S. clutch 40 is disengaged and the S.S.S. clutch 41 is engaged, the necessary auxiliary synchronising drive that is required to cause synchronous engagement of the S.S.S. clutch 41 being formed by the friction clutch 42 and the gear wheels 43 and 44.

An alternative way of operating the transmission system shown in Fig. 3 is to employ only the ahead coupling A for ahead running, and only the astern coupling B for astern running. In this case, during normal ahead running the two S.S.S. clutches 40 and 41 are disengaged and only the astern pinion 39 will be rotated by the propeller shaft 10; the gear wheels 36, 37, 43 and 44 will not be rotated, except possibly at low speed due to windage drag in the empty turbo coupling B.

Instead of clutches of the type comprising subsidiary ratchet drives for effecting synchronous engagement, other types of clutches may be employed, for example clutches the elements of which are provided with chamfered or flat-ended dogs and wherein the dogs on one element slide over the dogs on the other element when brought into contact prior to engagement of the clutch so long as there is appreciable relative motion between the clutch elements, but interengage when there is substantial synchronism between the clutch elements, for example under the action of a spring, or under the action of magnetic force, as described in the specification of co-pending application Serial No. 528,312, now Patent No. 2,876,878, dated March 10, 1959.

Referring to Figs. 4 and 5, the prime mover of the transmission system shown is a gas turbine 50, the output shaft 51 of which is coupled to the impeller 52 of an astern hydraulic turbo coupling B and is also drivably coupled by in-line shafting 53, 54, 55 to the impeller 56 of an ahead turbo coupling A, the shafts 53 and 55 projecting respectively through sleeve shafts 57, 58 on which are fixed the runners 59 and 60 of the turbo couplings. On the sleeve shaft 58 is fixed a pinion 61 that meshes with a gear wheel 62 on a lay shaft 63, on which is fixed a pinion 64 meshing with a gear wheel 65 fixed on a shaft 66 coupled to the propeller shaft (not shown). On the sleeve shaft 53 is formed a pinion 67 that meshes with an idler gear wheel 68 which meshes with a gear wheel 69 which is normally loose on lay shaft 63 but can be clutched to it by an S.S.S. clutch 70 of inverted type provided with a control sleeve 19. The pinion 61 can be clutched to the shaft 55 by means of an S.S.S. clutch of the magnetic engagement type as described in co-pending application Serial No. 528,312. The clutch comprises an intermediate member 71 mounted upon helical splines 71A formed on the shaft 55, the said intermediate member 71 being provided with external jaw clutch teeth 72 engageable with internal jaw clutch teeth 73 formed in the pinion 61. The clutch can be held in engagement by oil pressure in cylinders 74 the pistons of which are coupled to a control ring 75 that engages a flange 76 on the intermediate member 71. If the oil pressure is released when the system is in ahead operation the clutch disengages automatically under the action of driving torque, whereupon the ahead turbo coupling A takes up the transmission of power. The clutch re-engages automatically under the action of magnetic force at synchronism when the pinion 61 commences to over-run the shaft 55. The turbo couplings A and B are provided with adjustable scoop tubes 77 and 78 respectively by means of which the degree of filling of the working circuits of the couplings can be varied.

The auxiliary synchronising drive in this case comprises an auxiliary pinion 79 fixed on the shaft 80 connected to the primary rotor or impeller of a hydraulic turbo coupling C of adjustable filling type, pinion 79 meshing with gear wheel 62. The secondary shaft 81 connected to the runner of the turbo coupling C has fixed on it the idler gear wheel 68.

When the vessel is going ahead in normal operation, the working circuit of turbo coupling A is full and the working circuit of turbo coupling B is empty. The S.S.S. clutch 70 is disengaged, being either in the ratcheting position as shown, but preferably in a pawl-free position as described above. The working circuit of turbo coupling C is empty. The clutch 71—76 is engaged, so that the turbo coupling A is by-passed and there is direct drive from the turbine 50 to pinion 61, gear wheel 62, pinion 64 and gear wheel 65 to the shaft 66 and thence to the propeller. Due to the clutch 70 being disengaged the gear wheels 69 and 68 and pinion 67 do not rotate, except possibly at a low speed due to windage in the turbo coupling A.

For the purpose of manoeuvring, the S.S.S. clutch 70 is adjusted to ratcheting position, and the oil pressure in cylinders 74 is released, so that the direct drive to pinion 61 is interrupted and the ahead drive is taken up by the ahead coupling A. The auxiliary turbo coupling C is then filled, thereby establishing drive between gear wheels 65 and 69, the ratios of the gearing being such that the gear wheel 69 is rotated in the same direction as and slightly faster than the shaft 63, thereby causing the S.S.S. clutch 70 to move automatically to the engaged position, in which it is then locked by adjustment of its control sleeve 19, and turbo coupling C is emptied. Change-over from ahead to astern drive can then be effected by filling turbo coupling B and emptying turbo coupling A, the propeller then being driven in reverse via turbo coupling B, pinion 67, idler gear wheel 68, gear wheel 69, pinion 64, gear wheel 65 and shaft 66. Change-over between ahead and astern drive can then be effected as often as required by filling and emptying the appropriate turbo couplings A and B, coolers (not shown) for the working liquid being provided to dissipate the heat then generated in the working circuits.

When manoeuvring is completed with the vessel going ahead and normal ahead drive is to be restored with turbo coupling A full and turbo coupling B empty, the power from the gas turbine 50 is reduced or shut off momentarily, so that the over-running torque between pinion 61 and shaft 55 causes engagement of the inverted S.S.S. clutch 71—65, which is then locked in engagement by the restoration of oil pressure in the cylinders 74. Direct ahead drive is thereby re-established. The turbo coupling C may be filled if desired to relieve the clutch 70 from the idling drag load and permit the control sleeve to be moved to enable the clutch to disengage, whereupon turbo coupling C is emptied.

When the manoeuvring period is completed e.g., with the vessel in port the power transmission system is left ready for the next manoeuvring operation with the clutch 70 in engagement and the direct drive clutch 71—76 disengaged.

When the clutch means in the auxiliary synchronising drive are constituted by a turbo coupling as at C in Fig. 4 the gear ratio 62—79 must be such as to rotate the impeller of the turbo coupling sufficiently faster than the speed of the runner connected through gearing 68—69 to bring the S.S.S. clutch 70 into engagement, taking into account the slip in the turbo-coupling C when the shaft system is rotating at substantial speed.

I claim:
1. A power transmission system comprising a prime mover, forward and reverse power paths that include respectively a forward drive train of permanently meshed gear wheels and a reverse drive train of permanently meshed gear wheels, means for selectively drivably coupling said prime mover to said forward and reverse drive trains, a driven member adapted to be driven selectively through said forward drive train and said reverse drive train, and clutch means for enabling the drive between the driven member and at least one gear wheel of the reverse drive train to be interrupted when the forward drive train is operative for the normal ahead working of the system.

2. A power transmission system comprising a prime mover, forward and reverse power paths that include respectively a forward drive train of permanently meshed gear wheels and a reverse drive train of permanently meshed gear wheels, means for selectively drivably coupling said prime mover to said forward or reverse drive train, a driven member adapted to be driven selectively through said forward drive train or said reverse drive train, clutch means for enabling the drive between said driven member and at least one gear wheel of said reverse drive train to be interrupted when said forward drive train is operative for the normal ahead drive of the transmission system, said clutch means comprising two elements adapted to engage synchronously when one clutch element tends to over-run the other element in one direction, and an auxiliary synchronising drive which is operable during ahead rotation of the transmission system for establishing the over-running required for engagement of the said clutch means.

3. A power transmission system comprising a prime mover, forward and reverse power paths that include respectively a forward drive train of permanently meshed gear wheels and a reverse drive train of permanently meshed gear wheels, means for selectively drivably coupling said prime mover to said forward or reverse drive train, a driven member adapted to be driven selectively through said forward drive train or said reverse drive train, clutch means for enabling the drive between said driven member and at least one gear wheel of said reverse drive train to be interrupted when said forward drive train is operative for the normal ahead drive of the transmission system, said clutch means comprising two elements adapted to engage synchronously when one clutch element tends to over-run the other element in one direction, and an auxiliary synchronising drive which is operable during ahead rotation of the transmission system for establishing the over-running required for engagement of the said clutch means, said auxiliary synchronising drive comprising an auxiliary clutch with one clutch element drivably coupled to said driven member, and auxiliary gearing that drivably couples the other clutch element of said auxiliary clutch to a gear wheel of the reverse drive train that is disconnected from said driven member when said forward drive train is operative, the ratio of said auxiliary gearing being selected so that the over-running required to engage said clutch means occurs when said auxiliary clutch is engaged during ahead operation of the transmission system.

4. A power transmission system comprising a prime mover, forward and reverse power paths that include respectively a forward drive train of permanently meshed gear wheels and a reverse drive train of permanently meshed gear wheels, a first hydraulic turbo coupling of the type provided with means for varying the degree of filling of the working circuit, said first coupling being connected between said prime mover and said forward drive train, a second hydraulic turbo coupling of the type provided with means for varying the degree of filling of the working circuit, said second coupling being connected between said prime mover and said reverse drive train, a driven member adapted to be driven selectively through said forward drive train or said reverse drive train, first clutch means operable to enable the drive between said driven member and at least one gear wheel of said reverse drive train to be interrupted when said forward drive train is operative for the normal ahead working of the transmission system, and second clutch means operable to drivably connect the output shaft of said second hydraulic turbo coupling to said forward drive train whereby in forward drive power may be transmitted to said driven member simultaneously through said first and second hydraulic turbo couplings.

5. A power transmission system comprising a prime mover, forward and reverse power paths that include respectively a forward drive train of permanently meshed gear wheels and a reverse drive train of permanently meshed gear wheels, first and second hydraulic turbo couplings, each of the type provided with means for varying the degree of filling of the working circuit, connected between said prime mover and the respective drive trains, a driven member adapted to be driven selectively through said forward drive train or said reverse drive train, first clutch means operable to enable the drive between said driven member and at least one gear wheel of said reverse drive train to be interrupted when said forward drive train is operative for the normal ahead working of the transmission system, and second clutch means operable for drivably connecting said prime mover directly to said forward drive train.

6. A power transmission system comprising a prime mover, forward and reverse power paths that include respectively a forward drive train of permanently meshed gear wheels and a reverse drive train of permanently meshed gear wheels, means for selectively drivably coupling said prime mover to said forward or reverse drive train, a driven member adapted to be driven selectively through said forward drive train, or said reverse drive train, clutch means for enabling the drive between said driven member and at least one gear wheel of said reverse drive train to be interrupted when said forward drive train is operative for the normal ahead drive of the transmission system, said clutch means comprising two elements adapted to engage synchronously when one clutch element tends to over-run the other element in one direction, and a hydraulic turbo coupling of the type provided with means for varying the degree of filling of the working circuit and comprising vaned impeller and runner elements one of which is drivably coupled to said driven member and the other of which is drivably coupled to a gear wheel of said reverse drive train that is disconnected from said driven member when said forward drive train is operative.

References Cited in the file of this patent
UNITED STATES PATENTS

| | | |
|---|---|---|
| 2,260,581 | Pollard | Oct. 28, 1941 |
| 2,536,897 | Wood | Jan. 2, 1951 |
| 2,748,621 | Sinclair | June 5, 1956 |
| 2,762,230 | Meyer | Sept. 11, 1956 |